(12) United States Patent
Demange et al.

(10) Patent No.: US 12,041,940 B2
(45) Date of Patent: Jul. 23, 2024

(54) METHOD AND INSTALLATION FOR THE AUTOMATED PREPARATION OF CROWN-SHAPED TART SHELLS

(71) Applicant: COMPAGNIE DES PATISSIERS, Marseilles (FR)

(72) Inventors: Julien Demange, Aix en Provence (FR); Frédéric Matignon, Salon de Provence (FR)

( * ) Notice: Subject to any disclaimer, the term of this patent is extended or adjusted under 35 U.S.C. 154(b) by 157 days.

(21) Appl. No.: 17/553,847

(22) Filed: Dec. 17, 2021

(65) Prior Publication Data

US 2022/0192204 A1 Jun. 23, 2022

(30) Foreign Application Priority Data

Dec. 21, 2020 (FR) ...................................... 2013781

(51) Int. Cl.
*A21C 11/00* (2006.01)
*A21C 9/08* (2006.01)
(Continued)

(52) U.S. Cl.
CPC ............ *A21C 11/006* (2013.01); *A21C 9/081* (2013.01); *A21C 11/16* (2013.01); *A21D 8/02* (2013.01)

(58) Field of Classification Search
CPC .. A21C 5/00; A21C 9/08; A21C 9/081; A21C 9/83; A21C 9/085; A21C 9/086;
(Continued)

(56) References Cited

U.S. PATENT DOCUMENTS 1,879,951 A   9/1932   Roehl
2,585,379 A   2/1952   Fulmer
(Continued)

FOREIGN PATENT DOCUMENTS

CN   110419550 A       11/2019
GB       686797 A  *    1/1953
WO   2019232562 A1     12/2019

OTHER PUBLICATIONS

Bidot, Brandi; "Savory garlic and cheese pull-apart rolls recipe" Dec. 12, 2012; sheknows; https://www.sheknows.com/food-and-recipes/articles/978223/garlic-cheese-pull-apart-rolls-recipe/ (Year: 2012).*

(Continued)

*Primary Examiner* — Drew E Becker
*Assistant Examiner* — Austin Parker Taylor
(74) *Attorney, Agent, or Firm* — Cabinet Beau de Lomenie; Brian Gordaychik; Jonathan Bingham

(57) ABSTRACT

A method and an installation for the automated preparation of crown-shaped tart shells, comprising the conveying on a conveyor of crown-shaped recesses, the recesses being successively subjected to an extrusion step, a deposition step and a lining step, in which the extrusion step includes the filling of at least one cell of a rotary cell support cylinder with dough, the deposition step includes the ejection of the dough rolls out of the rotary cell support cylinder and the deposition on a shell of each recess of at least two separate dough rolls, and the lining step includes the crushing of the dough rolls deposited in each recess by means of a matrix complementary in shape to the recess in order to form a dough covering at least the shell of the recess.

14 Claims, 3 Drawing Sheets

(51) Int. Cl.
  *A21C 11/16* (2006.01)
  *A21D 8/02* (2006.01)
(58) Field of Classification Search
  CPC ..... A21C 11/00; A21C 11/006; A21C 11/008;
       A21C 11/16; A21C 11/163; A21D 8/02;
       A21D 8/08; A21D 13/10; A21D 13/14;
       A21D 13/16; A21D 13/19; A21D 13/30;
       A21D 13/31; A21D 13/80; A21B 3/13;
       A21B 3/133; A21B 3/134
  USPC .... 426/391, 496, 502, 503; 99/450.2, 450.3,
                                             99/450.6
  See application file for complete search history.

(56) References Cited

U.S. PATENT DOCUMENTS

| | | | | |
|---|---|---|---|---|
| 2,595,865 | A | | 5/1952 | Lunsford |
| 2,858,775 | A | * | 11/1958 | Marasso ................. A21C 5/04 |
| | | | | 425/332 |
| 3,307,502 | A | * | 3/1967 | Armour ............... A21C 11/006 |
| | | | | 425/383 |
| 3,381,632 | A | * | 5/1968 | Pontecorvo ............. A21B 5/02 |
| | | | | 425/441 |
| 3,425,363 | A | * | 2/1969 | Carbon ............... A21C 11/006 |
| | | | | 99/349 |
| 3,541,974 | A | * | 11/1970 | Atkins .................... A21C 5/00 |
| | | | | 425/437 |
| 3,590,748 | A | * | 7/1971 | Palmer .................. A21C 11/08 |
| | | | | 425/231 |
| 3,880,567 | A | | 4/1975 | Raichel |
| 3,937,335 | A | * | 2/1976 | Lanham .................. B65G 1/08 |
| | | | | 198/597 |
| 3,991,440 | A | * | 11/1976 | Hendrickson, Jr. .. A22C 7/0069 |
| | | | | 425/294 |
| 4,209,569 | A | * | 6/1980 | Brugger .................. A21B 3/13 |
| | | | | 205/213 |
| 4,381,697 | A | * | 5/1983 | Crothers ................. A21C 5/00 |
| | | | | 99/353 |
| 6,610,344 | B2 | | 8/2003 | Bell et al. |
| 9,565,861 | B2 | * | 2/2017 | Beasley ............... A21D 13/068 |
| 2004/0076725 | A1 | * | 4/2004 | Hayashi ................. A21C 9/088 |
| | | | | 426/503 |
| 2005/0276895 | A1 | | 12/2005 | Fuchi et al. |
| 2007/0178198 | A1 | * | 8/2007 | Lichtenstein ........ A21C 11/006 |
| | | | | 426/138 |
| 2016/0302430 | A1 | * | 10/2016 | Van Gerwen ........ A22C 7/0076 |
| 2019/0141944 | A1 | * | 5/2019 | Boffelli ................. A01J 25/008 |
| | | | | 99/464 |
| 2020/0163347 | A1 | * | 5/2020 | Bechtold ............. A21D 13/068 |
| 2021/0219558 | A1 | | 7/2021 | Rauch et al. |

OTHER PUBLICATIONS

English abstract of CN110419550, Nov. 8, 2019.

* cited by examiner

[Fig. 1]
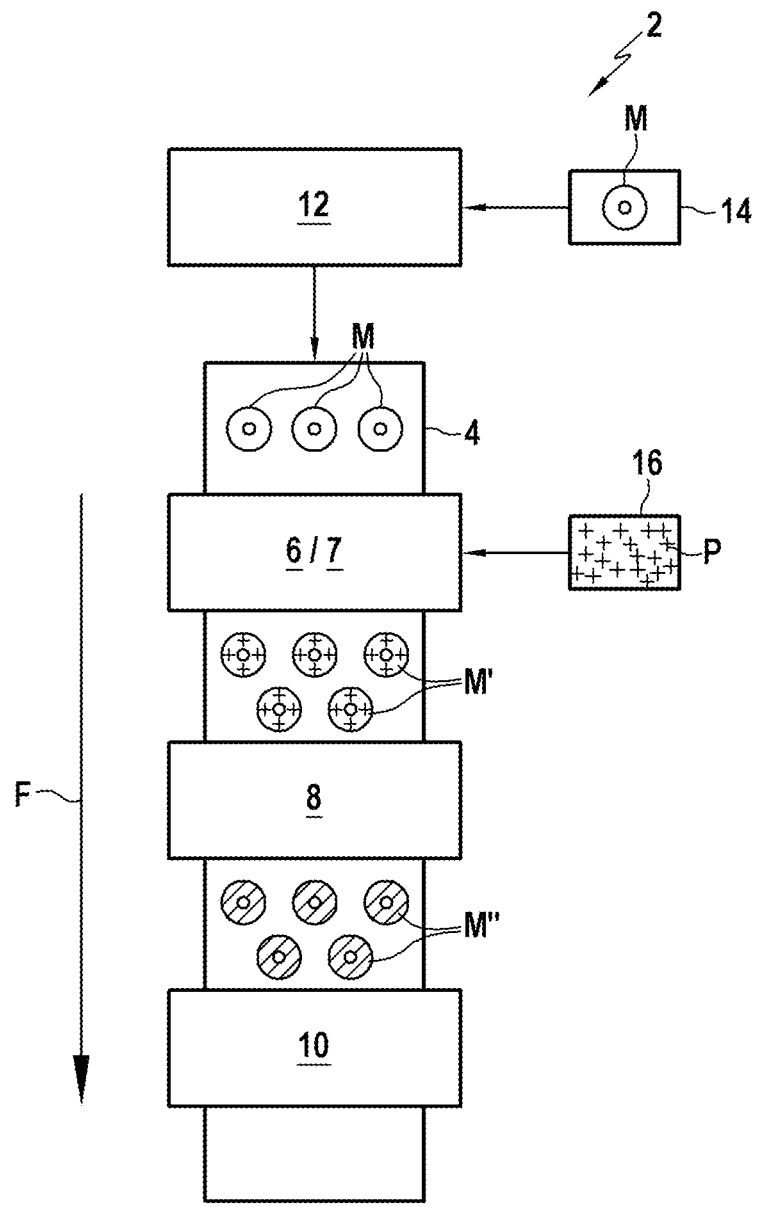

[Fig. 2]
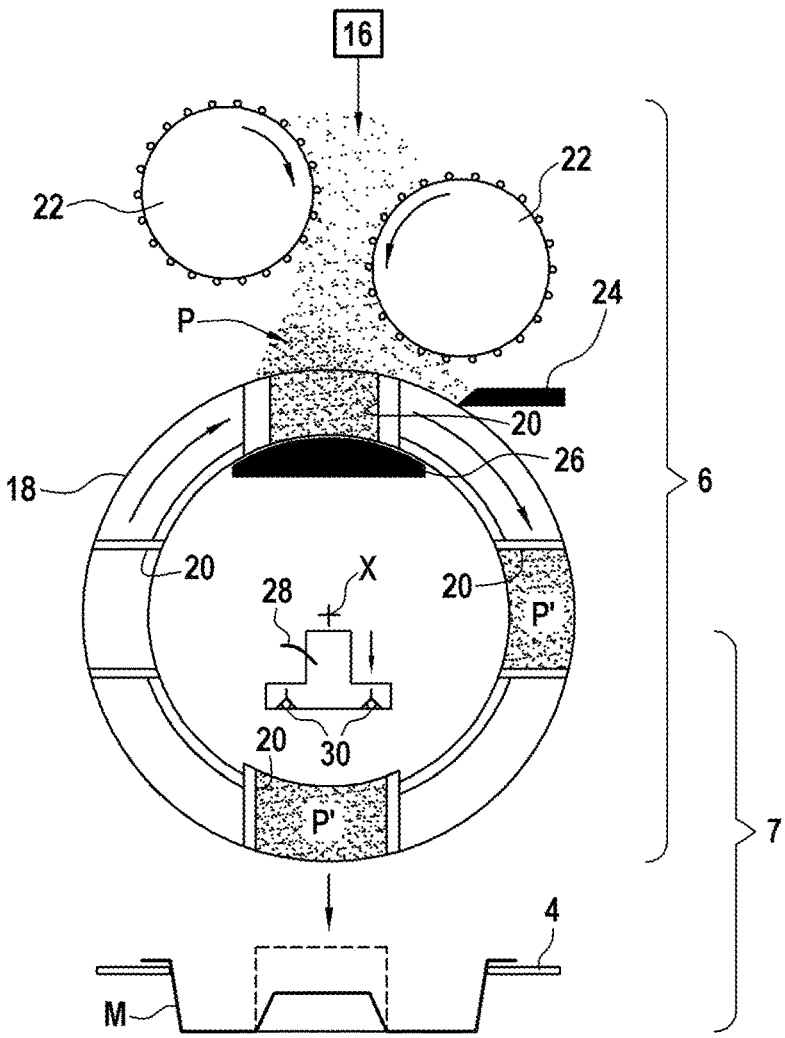
[Fig. 3]
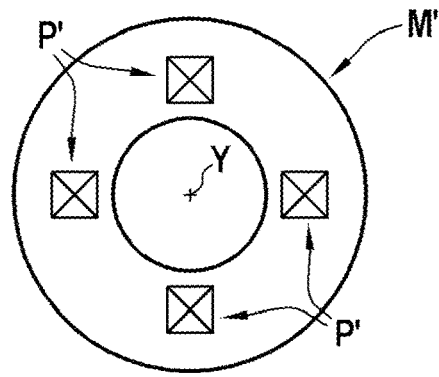

[Fig. 4]
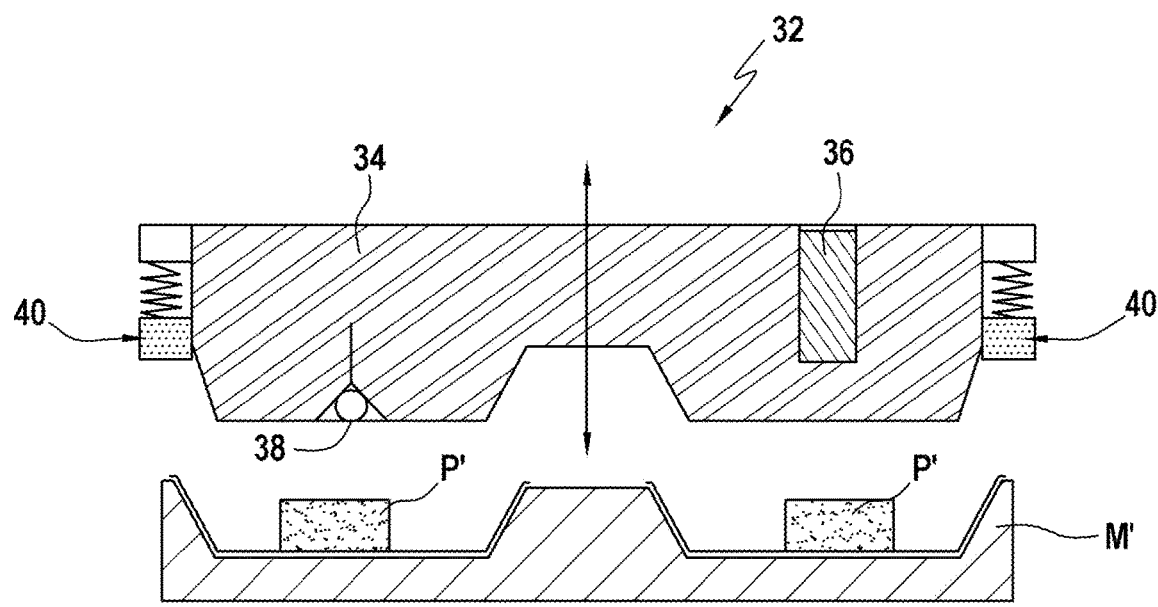

METHOD AND INSTALLATION FOR THE AUTOMATED PREPARATION OF CROWN-SHAPED TART SHELLS

TECHNICAL FIELD

The disclosure relates to the general field of pastry. It relates more specifically to the automatic production of tart shells having the shape of a crown.

BACKGROUND

A tart is a flat, most often round, pastry made of a dough shell with an edge filled with various ingredients (fruits, jam, cream, frangipane, etc.) that are cooked in the oven (except some red fruits that are put raw on the cooked dough) and that are generally eaten cooled.

It is known to produce tart shells in an automated manner and on an assembly line by means of a production line in which tart pans are conveyed from one module to another module. Alternatively, the production line may include cavities formed in a plate conveyed from one module to another module, the cavities having a tart pan shape.

Particularly, these production lines typically include an extrusion module at which the dough derived from a die is deposited in the form of a dough roll in each tart pan or cavity, and a lining module disposed downstream of the extrusion module and at which the dough roll deposited in each tart pan is crushed to match the shape of the tart pan or of the cavity. The tart shells thus prepared can then be optionally precooked before being removed from the pan and packaged for storage and transport.

It is also known to produce crown-shaped or ring-shaped tart shells. Tart pans have been specially designed to produce such tart shells. Typically, these pans are in the form of a conventional tart pan with, in the center, a round hole provided with an annular edge.

Given the particular shape of these tart pans, there is currently no method allowing the manufacture of crown-shaped tart shells in an automated manner and on an assembly line.

SUMMARY

The present disclosure therefore aims at proposing a fully automated method for manufacturing crown-shaped tart shells.

In accordance with the disclosure, this aim is achieved thanks to a method for the automated preparation of crown-shaped tart shells, comprising the conveying on a conveyor of crown-shaped recesses, the recesses being successively subjected to an extrusion step, a deposition step and a lining step, method in which:
  the extrusion step includes the filling of at least one cell of a rotary cell support cylinder with dough;
  the deposition step includes the ejection of the dough rolls out of the rotary cell support cylinder and the deposition on a shell of each recess of at least two separate dough rolls; and
  the lining step includes the crushing of the dough rolls deposited in each recess by means of a matrix complementary in shape to the recess in order to form a dough covering at least the shell of the recess.

By "recess" it is meant here a tart pan positioned on the conveyor, or a cavity produced directly in a plate conveyed by the conveyor. The method according to the disclosure is remarkable in that it provides, during the deposition step, for depositing at least two separate and eccentric dough rolls (i.e. pieces of dough) within each recess, then to line these dough rolls using a matrix complementary in shape to the recess in order to allow the dough to cover the entire shell thereof. This sequence of steps thus allows producing crown-shaped (or ring-shaped) tart shells in an automated manner and on an assembly line.

The deposition step may include the deposition within each recess of four separate dough rolls evenly spaced about an axis of symmetry of the recess so as to further facilitate obtaining a crown-shaped tart shell during the lining step.

For recess, said at least two dough rolls may be deposited simultaneously during the deposition step.

According to one advantageous disposition, during the deposition step, the dough rolls are ejected out of the rotary cell support cylinder by an ejector equipped with air valves which release air between the ejector and the dough roll in order to prevent the dough from sticking to the ejector.

According to another advantageous disposition, the lining step includes the heating of the matrix in order to prevent the dough covering the shell of the recess from sticking to the matrix.

According to yet another advantageous disposition, the lining step further includes the injection of air between the matrix and the dough covering the shell of the recess in order to facilitate the detachment from the matrix.

In the case where the recesses are tart pans, the method may further include, prior to the extrusion step, a step of unstacking the tart pans during which stacks of tart pans are automatically unstacked to be deposited on the conveyor.

Correlatively, the disclosure also relates to an installation for the automated preparation of crown-shaped tart shells, comprising a conveyor intended to move crown-shaped recesses along a production line, an extrusion module intended to fill at least one cell of a rotary cell support cylinder with dough, a deposition module for ejecting dough rolls out of the cell support cylinder and depositing at least two separate dough rolls on a shell of each recess, and a lining module intended to crush the dough rolls deposited in each recess by means of a matrix complementary in shape to the recess in order to form a dough covering at least the shell of the recess.

The extrusion module may include a rotary cell support cylinder provided with at least one cell intended to be filled with dough in order to form a dough roll, and ejectors intended to eject the dough rolls out of the rotary cell support cylinder. In this case, the ejectors of the extrusion module may include air valves for releasing air between the ejector and the dough roll.

The lining module may include a matrix complementary in shape to the recess intended to come against the recess in order to crush the dough rolls and form dough covering at least the shell of the recess. In this case, the matrix of the lining module may include at least one electrical resistance for heating the matrix, and at least one air valve for injecting air between the matrix and the dough covering the shell of the recess.

BRIEF DESCRIPTION OF THE DRAWINGS

FIG. 1 is a functional view of the various modules of the installation for implementing the method according to the disclosure.

FIG. 2 schematically represents the extrusion and deposition modules of the installation for implementing the method according to the disclosure.

FIG. 3 is a schematic top view of a tart pan leaving the extrusion module.

FIG. 4 schematically represents the lining module of the installation for implementing the method according to the disclosure.

DETAILED DESCRIPTION

The method according to the disclosure relates to the manufacture of crown-shaped (or ring-shaped) tart shells in a fully automated manner and on an assembly line. These tart shells have a ring-shaped flat shell that extends at its internal diameter and external diameter by annular edges.

These tart shells can be manufactured from tart dough, for example pie dough or sugar dough, previously prepared and which is deposited in the shell of the tart pans M. These tart pans also have the shape of a crown with a flat ring-shaped shell which extends at its internal diameter and its external diameter by annular edges. Alternatively, the tart shells can be manufactured from tart dough deposited in the shell of a plurality of cavities produced directly in a plate positioned on the conveyor, these cavities also having the shape of a crown with a flat shell which extends at its diameters by annular edges.

In the remainder of the description, the manufacturing method according to the disclosure will be described in an application with tart pans, it being understood that the present disclosure also applies to a manufacturing method using a crown-shaped cavity plate.

The various steps of manufacturing these tart shells according to the method in accordance with the disclosure are implemented by an installation such as the one represented in FIG. 1.

This installation 2 is a production line which includes in particular a conveyor 4 for carrying tart pans successively through an extrusion module 6, a deposition module 7, a lining module 8, and possibly a pre-cooking, cooking or deep-freezing module 10.

The installation may also include, upstream of the extrusion module 6, a module 12 for unstacking the tart pans (this module being absent in case of use of a cavity plate). More specifically, from stacks 14 of tart pans M, such an unstacking module 12 has the function of automatically "unstacking" these stacks 14 in order to deposit the pans M on the conveyor 4.

The operation of this unstacking module 12 can be the following. A rotary arm provided with suction cups is positioned in front of a stack of tart pans. A suction of the suction cups is then activated to catch a pan in the bottom of the stack, then the rotary arm is pivoted to move above the conveyor 4. The suction of the suction cups is then deactivated, which allows the seized pan to be deposited on the conveyor. The unstacking operation is repeated continuously in synchronization with the progress of the conveyor.

The tart pans M are then driven by the conveyor 4 and pass under an extrusion module 6 and a deposition module 7 such as those schematically represented in FIG. 2.

The extrusion module 6 is fed with dough P previously prepared from a die 16. It includes in particular a rotary cell support cylinder 18 having a horizontal axis of symmetry X. This cell support cylinder 18 is positioned perpendicularly to the direction of progress F of the conveyor and is rotated about its axis of symmetry X.

As represented in FIG. 2, the cell support cylinder 18 includes a plurality of through cells 20 which are intended to be filled with dough to form dough rolls (that is to say pieces of dough).

These cells 20 are dimensioned according to the dimensions desired to be given to the dough rolls deposited in the tart pans. When these cells are in the high position, they are fed by gravity with dough P coming from the die 16 by means of extruder rollers 22. An outer scraper 24 allows retaining the dough which accumulates on the external periphery of the cell support cylinder 18.

Furthermore, an internal abutment 26 is positioned inside the cell support cylinder facing the cell 20 during filling in order to prevent the dough from escaping out of the cell. When the dough P has completely filled a cell 20, it forms a dough roll P'.

Once the dough roll P' thus formed is in the low position (after a 180° rotation of the cell support cylinder), it is ejected out of the cell 20 to fall by gravity into a tart pan M positioned below on the conveyor 4.

For this purpose, the deposition module 7 includes ejectors 28 intended to eject the dough rolls P' out of the cell support cylinder 18.

These ejectors 28 are movable parts between a high position and a low position which are dimensioned and actuated to pass through the cells 20 and thus eject the dough rolls out of them when these cells are in the low position.

These ejectors 28 may each be equipped with air valves 30 which are activated when the ejector descends through a cell 20. They thus allow releasing air between the ejector and the dough roll P' in order to prevent the latter from sticking to the ejector.

According to the disclosure, the cell support cylinder 18 with its cells 20 and its ejectors 28 are configured to deposit at least two separate dough rolls P' (that is to say each coming from a cell) within the same tart pan M.

These separate dough rolls P' may be simultaneously deposited and may not be in contact with each other during their deposition.

Also, as represented in FIG. 3, these dough rolls P' may be four in number and may be deposited to be evenly spaced about an axis of symmetry Y of the tart pan M.

The tart pans M' in which the dough rolls P' have been deposited are then conveyed towards the lining module 8.

As represented more specifically in FIG. 4, this lining module 8 uses the principle of the matrix/counter-matrix to crush the dough rolls. It includes a head 32 movable between a high position and a low position and equipped with a plurality of matrices 34 each having a shape complementary to the tart pan M.

When the head 32 of the lining module goes down to its low position in the pan M', the matrix 34 will crush the dough rolls P' in order to form a dough covering the entire shell of the tart pan.

Each matrix 34 may include at least one electrical resistance 36 for heating the matrix in order to prevent the dough from sticking to the matrix under the effect of crushing.

Also, each matrix 34 may include at least one air valve 38 for injecting air between the matrix and the dough covering the shell of the tart pan. This air injection allows facilitating the detachment of the dough from the matrix once it goes up to the high position.

Still, each matrix 34 may further include parts 40 mounted on springs facing the edges of the tart pan in order to ensure a sealing of the matrix/counter-matrix assembly.

The tart pans M" with their dough shell thus formed can optionally then be conveyed towards an additional module 10 (to undergo pre-cooking, cooking or deep-freezing for example).

The invention claimed is:

1. A method for automatically preparing crown-shaped tart shells, the method comprising:
conveying, on a conveyor, crown-shaped recesses successively subjected to an extrusion step, a deposition step and a lining step,
wherein the extrusion step comprises filling of at least one cell of a rotary cell support cylinder with dough;
wherein the deposition step comprises electing dough rolls out of the rotary cell support cylinder and depositing at least two separate dough rolls on a shell of each recess;
wherein the lining step comprises crushing the at least two separate dough rolls deposited in each recess by a matrix complementary in shape to the recess, in order to form a dough covering at least the shell of the recess.

2. The method according to claim 1, wherein the deposition step comprises the deposition within each recess of four separate dough rolls evenly spaced about an axis of symmetry of the recess.

3. The method according to claim 1, wherein, for each recess, said at least two dough rolls are deposited simultaneously during the deposition step.

4. The method according to claim 1, wherein, during the deposition step, the dough rolls are ejected out of the rotary cell support cylinder by an ejector equipped with air valves which release air between the ejector and the dough roll.

5. The method according to claim 1, wherein the lining step comprises the heating of the matrix in order to prevent the dough covering the shell of the recess from sticking to the matrix.

6. The method according to claim 1, wherein the lining step further comprises the injection of air between the matrix and the dough covering the shell of the recess in order to facilitate the detachment from the matrix.

7. The method according to claim 1, wherein the recesses are tart pans, the method further comprising, prior to the extrusion step, a step of unstacking the tart pans during which stacks of tart pans are automatically unstacked to be deposited on the conveyor.

8. The method of claim 1, wherein the two separate dough rolls fall directly and by gravity from the rotary cell support cylinder into the crown-shaped recesses.

9. A system for the automated preparation of crown-shaped tart shells, the system comprising:
a conveyor configured to move crown-shaped recesses along a production line, a cell of a rotary cell support cylinder configured to be filled with dough,
an ejector configured to eject dough rolls out of the cell support cylinder and to deposit at least two separate dough rolls on a shell of each recess, and
a matrix complementary in shape to the recess configured to crush the dough rolls deposited in each recess in order to form a dough covering at least the shell of the recess.

10. The system according to claim 9, further comprising: ejectors configured to eject the dough rolls out of the rotary cell support cylinder.

11. The system according to claim 10, wherein the ejectors of the extrusion module comprise air valves configured to release air between the ejector and the dough roll.

12. The system according to claim 9, wherein the matrix comprises at least one electrical resistance configured to heat the matrix, and at least one air valve configured to inject air between the matrix and the dough covering the shell of the recess.

13. A method for automatically preparing crown-shaped tart shells, the method comprising:
filling of at least one cell of a rotary cell support cylinder with dough;
ejecting dough rolls out of the rotary cell support cylinder and depositing at least two separate dough rolls on a shell of a crown shaped recess; and
crushing the at least two separate dough rolls deposited on the crown shaped recess in order to form a dough covering at least a shell of the recess.

14. The method of claim 13, wherein the method is performed via a conveyor.

\* \* \* \* \*